(12) United States Patent
Bhesania et al.

(10) Patent No.: US 7,577,765 B2
(45) Date of Patent: Aug. 18, 2009

(54) ADVANCED POWER MANAGEMENT IN GENERIC USB DRIVERS

(75) Inventors: Firdosh K. Bhesania, Kirkland, WA (US); Randall E Aull, Kenmore, WA (US)

(73) Assignee: Microsoft Corporation, Redmond, WA (US)

(*) Notice: Subject to any disclaimer, the term of this patent is extended or adjusted under 35 U.S.C. 154(b) by 293 days.

(21) Appl. No.: 10/854,407

(22) Filed: May 25, 2004

(65) Prior Publication Data

US 2005/0246564 A1 Nov. 3, 2005

Related U.S. Application Data

(63) Continuation of application No. 10/837,444, filed on Apr. 29, 2004.

(51) Int. Cl.
*G06F 3/00* (2006.01)
*G06F 1/00* (2006.01)
*G06F 13/00* (2006.01)

(52) U.S. Cl. .......................... 710/10; 710/8; 713/323; 713/324; 713/340; 719/327; 719/328

(58) Field of Classification Search ................. 713/320; 710/10, 14
See application file for complete search history.

(56) References Cited

U.S. PATENT DOCUMENTS

| 5,129,064 | A | | 7/1992 | Fogg, Jr. et al. |
| 5,784,628 | A | * | 7/1998 | Reneris ...................... 713/300 |
| 5,905,900 | A | * | 5/1999 | Combs et al. ............... 713/320 |
| 5,910,180 | A | | 6/1999 | Flory et al. |
| 5,926,775 | A | | 7/1999 | Brumley et al. |
| 5,931,935 | A | * | 8/1999 | Cabrera et al. .............. 710/260 |
| 6,243,753 | B1 | | 6/2001 | Machin et al. |
| 6,378,005 | B1 | | 4/2002 | Hyder et al. |
| 6,463,465 | B1 | * | 10/2002 | Nieuwejaar ................. 709/217 |

(Continued)

FOREIGN PATENT DOCUMENTS

WO WO9939254 A 8/1999

(Continued)

OTHER PUBLICATIONS

"USBIO COM Interface USB Software Development Kit for Windows COM Interface Reference Manual", Thesycon Systemsoftware & Consulting GmbH, Jan. 31, 2003, pp. 1-30.

(Continued)

*Primary Examiner*—Eron J. Sorrell
*Assistant Examiner*—Dean Phan

(57) ABSTRACT

Techniques are disclosed to provide advanced power management in generic USB drivers. More particularly, a generic USB device driver architecture is described which enables development through a user-mode USB library that accesses a generic kernel-mode driver. The architecture may be utilized to provide advanced power management. In a described implementation, a method includes defining a power management policy for a device plugged into a computing system and utilizing the defined power management policy to determine when the device enters a suspend mode. Once the device enters the suspend mode, the method allows the computing system to enter a lower-power state. In a further described implementation, the power management policy is defined through a plurality of routines provided by a generic user-mode library (e.g., a dynamic link library (DLL)), where the generic user-mode library is communicatively coupled to a kernel-mode generic device driver.

19 Claims, 6 Drawing Sheets

U.S. PATENT DOCUMENTS

| | | | |
|---|---|---|---|
| 6,480,801 | B2 | 11/2002 | Chew |
| 6,598,169 | B1 | 7/2003 | Warwick et al. |
| 6,647,473 | B1 | 11/2003 | Golds et al. |
| 6,651,171 | B1 | 11/2003 | England et al. |
| 6,678,773 | B2 | 1/2004 | Marietta et al. |
| 7,032,228 | B1 | 4/2006 | McGillis et al. |
| 7,047,534 | B2 | 5/2006 | Sadovsky et al. |
| 7,055,048 | B2 | 5/2006 | Warwick et al. |
| 7,057,986 | B2 | 6/2006 | Fukuchi |
| 2002/0004852 | A1 | 1/2002 | Sadovsky et al. |
| 2002/0052727 | A1* | 5/2002 | Bond et al. ............ 703/26 |
| 2002/0143921 | A1 | 10/2002 | Stephan |
| 2003/0043771 | A1 | 3/2003 | Mizutani et al. |
| 2003/0046446 | A1 | 3/2003 | Basler |
| 2003/0182400 | A1* | 9/2003 | Karagounis et al. ........ 709/219 |
| 2003/0227641 | A1 | 12/2003 | Edmonds et al. |
| 2004/0001504 | A1* | 1/2004 | Rostron et al. ............ 370/463 |
| 2004/0003135 | A1* | 1/2004 | Moore ................ 709/321 |
| 2004/0019749 | A1 | 1/2004 | Mochida et al. |
| 2004/0177361 | A1 | 9/2004 | Bernhard et al. |
| 2004/0210911 | A1 | 10/2004 | Bodin et al. |
| 2005/0086665 | A1 | 4/2005 | Matsuura |
| 2005/0138644 | A1 | 6/2005 | Montecalvo et al. |
| 2005/0147253 | A1* | 7/2005 | Coffin et al. ............ 381/1 |

FOREIGN PATENT DOCUMENTS

| | | |
|---|---|---|
| WO | WO02067483 | 8/2002 |

OTHER PUBLICATIONS

"USBIO USB Software Development Kit for Windows" Thesycon Systemsoftware & Consulting GmbH, Jan. 31, 2003, pp. 1-32.

Search Report from the European Patent Office for Patent Application 05103495.7, Oct. 24, 2007.

Communication from the Euerpean Patent Office for Patent Application 05103495.7, Jul. 8, 2008.

Communication from the Shanghai Patent and Trademark Law Office for Patent Application 200510089608.7, Feb. 15, 2008.

Communication from the Shanghai Patent and Trademark Law Office for Patent Application 200510089608.7, Aug. 15, 2008.

* cited by examiner

ABVANCED POWER MANAGEMENT IN GENERIC USB DRIVERS

ADVANCED POWER MANAGEMENT IN GENERIC USB DRIVERS

RELATED APPLICATION(S)

This is a continuation of U.S. Pat. Ser. No. 10/837,444, entitled "Generic USB Drivers", which was filed Apr. 29, 2004.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. ©2004 Microsoft Corporation. All rights reserved.

TECHNICAL FIELD

The present invention generally relates to digital communications and, in an implementation, to generic universal serial bus (USB) drivers.

BACKGROUND

As computers become more commonplace, an ever-increasing number of functionalities are incorporated into a single computer system. Often, the additional functionality is provided by attaching an external device to the computer system. In turn, the external device communicates with the computer system to provide the additional functionality.

The Universal serial bus (USB) has become a standard communication channel for connecting external devices to a computer system. USB allows a number of devices to be connected to a same computer system simultaneously, while providing relatively high bandwidth. For example, the latest commonly available version of USB (e.g., USB 2.0) can transfer up to 480 Mbps (mega bits per second).

Vendors who provide USB devices are generally required to provide device drivers to enable access to these devices. Commonly, a device driver is a program and set of data that allows a computer system to access the device (e.g., read data from the device, write data to the device, send commands to the device, and receive status data from the device).

Currently, most USB device vendors are required to provide kernel-mode device drivers for their devices. Generally, a kernel is the central part of an operating system (OS) which remains active and in control of a computer system while the OS is running. For example, the kernel provides the necessary services (such as memory and process management) to the computer system. As a result, kernel-mode drivers can easily cause an unrecoverable system-wide crash in the event of the smallest of malfunctions (or bugs). Additionally, implementing USB drivers in kernel-mode necessitates investment of time and energy in programming complicated kernel-mode drivers, in addition to extra hardware or software required for testing the kernel-mode driver. Furthermore, when upgrading an OS, incompatible or outdated kernel-mode device driver may cause a crash and prevent a successful system upgrade.

SUMMARY

Techniques are disclosed to provide a generic USB driver. More particularly, a generic USB device driver architecture is described, which enables development through a user-mode USB library that communicates with a generic kernel-mode driver.

In a described implementation, a method includes loading a kernel-mode generic device driver in response to a plug-in event of a device. A user software component accesses the device by utilizing routines provided by a generic user-mode library (e.g., a dynamic link library (DLL)) that communicates with the generic device driver.

In another implementation, a separate generic device driver is loaded for each plugged-in device, or for each functionality supported by a device.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

Moreover, the computer program product encodes a computer program for a computer process executing on a computer system. The computer process loads a kernel-mode generic device driver in response to a plug-in event of a device (as may be detected by a plug and play module). A user software component accesses the device by utilizing routines provided by a generic user-mode library (e.g., a dynamic link library (DLL)).

Other implementations are also described and recited herein.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The following disclosure describes techniques to provide a generic device driver architecture. More specifically, Techniques are disclosed to provide generic USB drivers. More particularly, the architecture utilizes a user-mode USB library which accesses a generic kernel-mode driver. The architecture, in part, reduces the development time of device drivers, improves the end-user experience (e.g., by limiting system-wide crashes whether during normal operations or an upgrade process), and centralize testing and debugging. The architecture may also be utilized to improve input-output (I/O) handling, security, and power management as will be further discussed herein. Moreover, the techniques discussed herein may be implemented as software, firmware, hardware, and/or combinations thereof.

Overview of Generic Drivers

Figure 1:
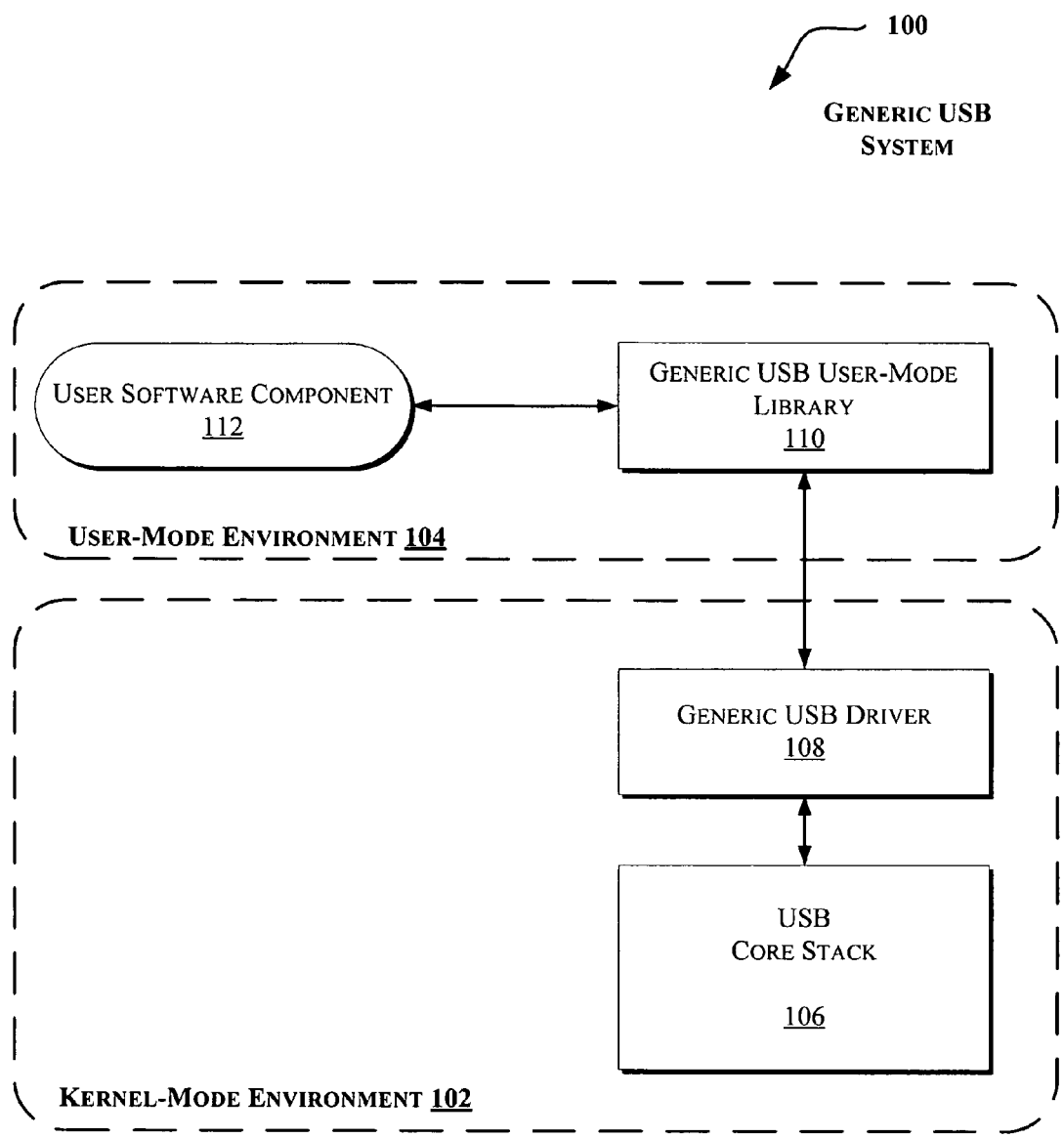
FIG. 1 illustrates an exemplary system for a generic device driver.

FIG. 1 illustrates an exemplary system 100 for a generic device driver. The direction of the arrows in FIGS. 1 and 2 herein indicate direction of data flow in accordance with an implementation. The system 100 includes a kernel-mode environment 102 and a user-mode environment 104. The kernel-mode environment 102 includes a USB core stack 106 which may be a portion of the OS and enables communication with USB devices at the hardware level. The USB core stack 106 may facilitate hub functionality as will be further discussed with reference to FIG. 2. The USB core stack 106 is coupled to a generic USB driver 108. The generic USB driver 108 manages the I/O of the USB device, and, more generally exposes the USB device to the user-mode environment 104.

The user-mode environment 104 includes a generic USB user-mode library 110 and a user software component 112. Accordingly, the user software component 112 is a user-mode software component in an implementation. The generic USB user-mode library 110 provides routines (or application programming interfaces (APIs)) which may be utilized by the USB user software component 112 to communicate with or control the USB device. In an implementation, the generic USB user-mode library 110 is a DLL. Accordingly, the USB user software component 112 may manage a USB device from the user-mode environment 104 by invoking routines in the user mode rather than the kernel mode. A number of exemplary APIs will be further discussed below under the same title.

Such an implementation is envisioned to reduce system-wide crashes because if the USB user software component 112 (or a routine provided by the generic USB user-mode library 110) crashes, the kernel's operation remain unaffected. Additionally, such a system (100) reduces the development time of device drivers and centralize testing and debugging (in part, because only one computer system is needed to test the USB interface, i.e., even when a user-mode software component crashes, the system remains operational).

Figure 2:
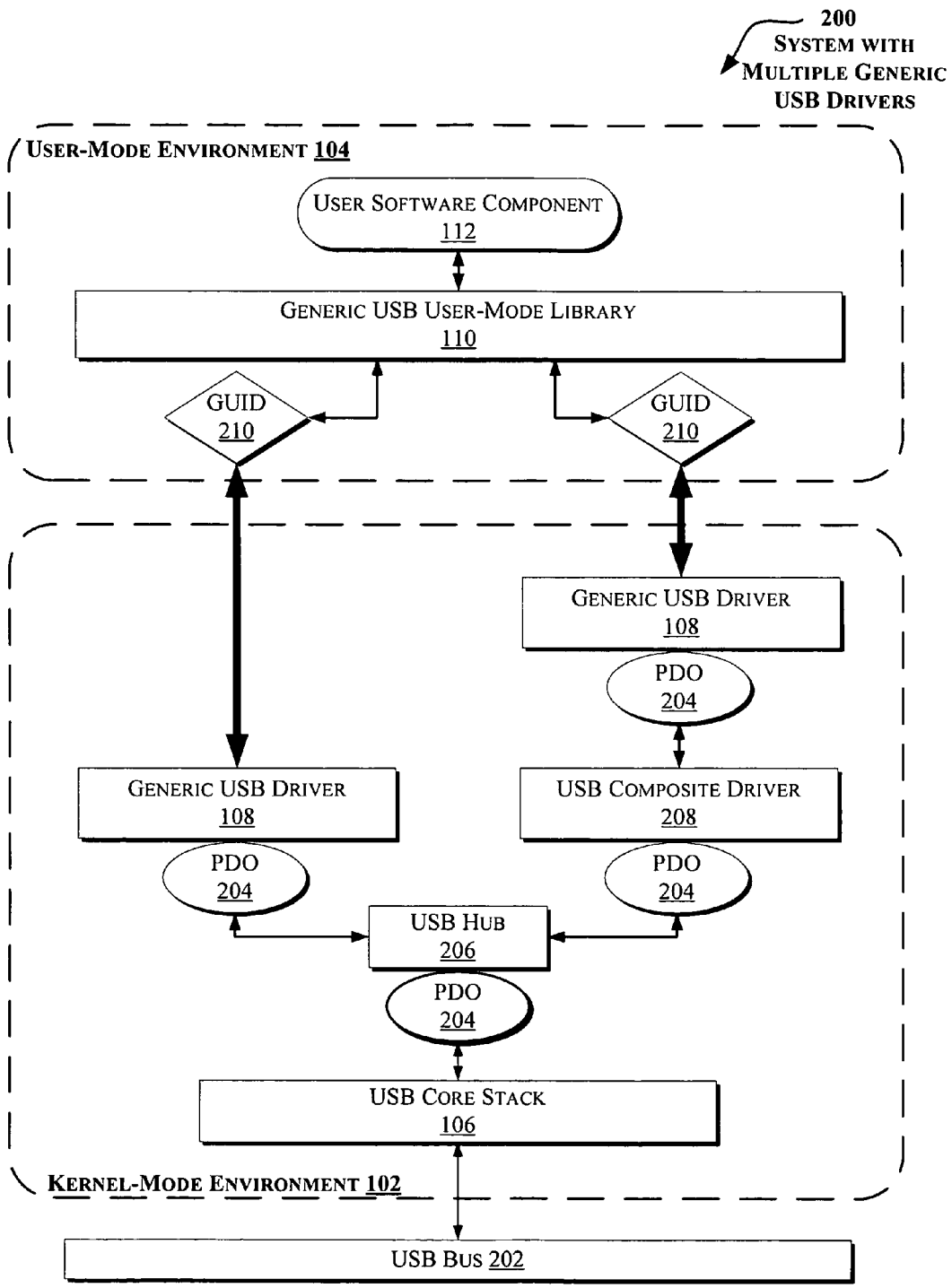
FIG. 2 illustrates an exemplary a system with multiple instances of generic device drivers for multiple devices.

In one implementation, data corresponding to the communication interface between USB core stack 106 and the generic USB driver 108 is published to developers or otherwise available publicly, as well as information regarding the interface between the USB user software component 112 and the generic USB user-mode library 110. In an implementation, the information regarding the interface between the generic USB driver 108 and the generic USB user-mode library 110 need not be published Generic Drivers for Multiple Devices FIG. 2 illustrates an exemplary a system 200 with multiple instances of generic device drivers for multiple devices. The system 200 includes the kernel-mode environment 102, user-mode environment 104, USB core stack 106, generic USB user-mode library 110, and the USB user software component 112.

The system 200 includes a USB bus 202 to communicate data (as will be further discussed with reference to FIG. 6 below). A USB bus is but one example and other types of data communication buses (such as a wired or wireless communication bus, e.g., Bluetooth, small computer system interface (SCSI), and the like) may be utilizes in the system 200.

As illustrated in FIG. 2, the USB bus 202 is coupled to the USB core stack 106 (as discussed with respect to FIG. 1). The USB core stack 106 is in turn coupled to a physical device object (PDO) to facilitate communication with a USB hub 206. The USB hub 206 allows multiple USB devices to be handled in the kernel-mode environment 102. Accordingly, it is envisioned that the generic USB drivers (108) may be coupled between the kernel-mode environment 102 and the user-mode environment 104.

As illustrated in FIG. 2, multiple PDOs may be utilized to facilitate communication with various drivers (e.g., the generic USB driver 108 and a USB composite driver 208). The user environment 104 may communicate with each generic USB driver (108) through functionality discovered and/or identified by globally unique identifiers (GUID) 210. Each GUID 210 uniquely identifies its USB interface/function. In one exemplary implementation, the format for the GUID key in the OS registry file and/or driver file (e.g., information file (INF)), such as the Windows OS available through Microsoft Corporation of Redmond, Wash., is as follows:

HKR,,DeviceInterfaceGUID,,"{058815B2-9805-47d3-B7D5-ABC464D3CA06}"

Accordingly, each GUID 210 identifies functionality supported by the corresponding device which may be utilized by the USB user-mode software component 112. For example, a user-mode software component will search for any drivers that expose their GUID of interest to find the device(s) that support the desired functionality. A USB user software component 112 may then communicate with a USB device through the generic USB user-mode library 110 as discussed with reference to FIG. 1.

It is envisioned that multiple USB hubs (206) may be utilized to permit communication with multiple USB devices or functionalities incorporated within a single USB device. For example, a USB hub (206) may be utilized to allow access to different functionalities within a keyboard with multimedia command buttons, in addition to key stroke buttons or integrated pointing devices (e.g., joystick and or touch pad).

Generic Device Driver Operation

Figure 3:
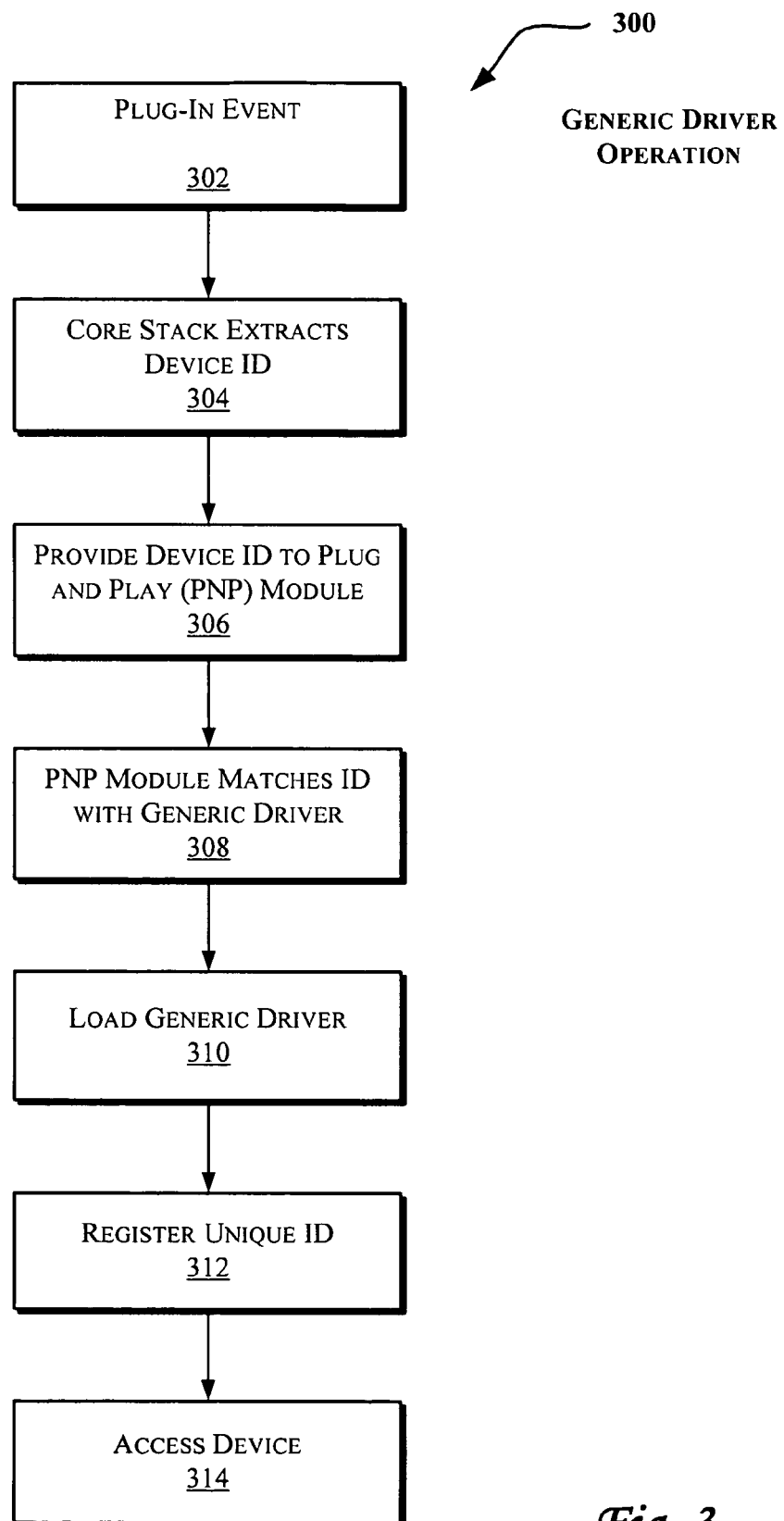
FIG. 3 illustrates an exemplary method for utilizing generic device drivers.

FIG. 3 illustrates an exemplary method 300 for utilizing generic device drivers. Upon occurrence of a plug-in event (302) which may be detected by a plug and play (PNP) module (e.g., residing in the OS), a core stack (e.g., 106 of FIGS. 1 and 2) extracts a device ID corresponding to the plugged-in device. The extracted device ID is provided or detected by the PNP module (306) and the PNP module matches the extracted device ID with a generic driver (308) (e.g., 108 of FIG. 2).

The matched generic driver (e.g., 108 of FIG. 1 and 2) is loaded (310) to facilitate communication between the loaded device driver of stage 310 and a user software component (e.g., 112 of FIGS. 1 and 2). In a stage 312, a unique ID is registered (such as discussed with reference to 210 of FIG. 2). Finally, the plugged-in device may be accessed (314) by the user software component through the generic device driver.

In an implementation, it is envisioned that the PNP module matches the extracted device ID to the generic device driver (e.g., where the generic device driver is compatible with the plugged-in device), rather than another device ID. This in turn eliminates the need for loading any additional drivers. Accordingly, in one implementation, a kernel-mode generic device driver is loaded in response to a plug-in event of a device and a user software component accesses the device by utilizing routines provided by the generic user-mode library. The generic user-mode library is communicatively coupled to the generic device driver. The routines may be implemented as APIs (which will be further discussed below under the title "exemplary APIs"). Furthermore, a separate generic device driver may be loaded for each plugged-in device (or functionalities supported by the device).

I/O Handling in Generic Device Drivers

Figure 4:
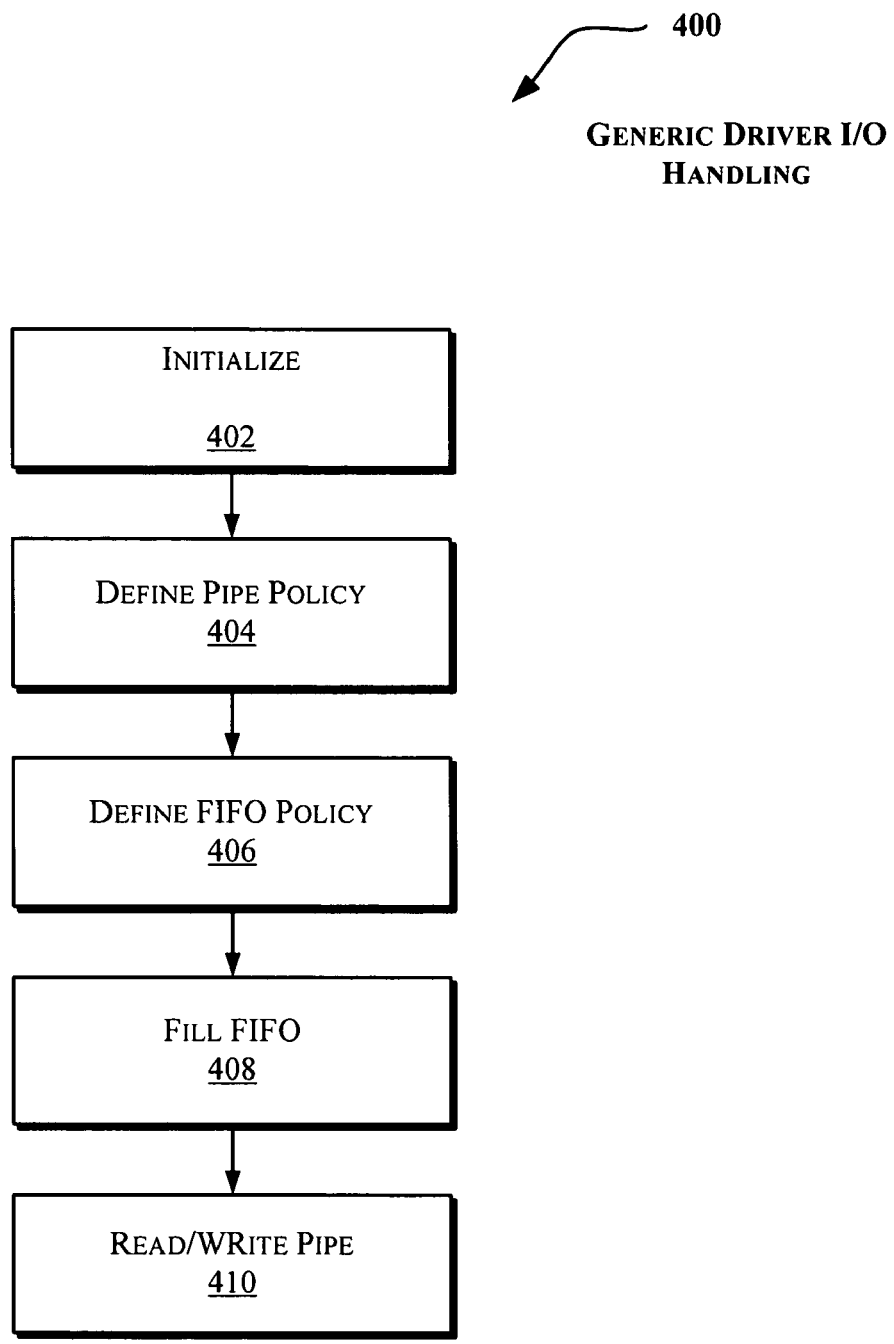
FIG. 4 illustrates an exemplary method for handling I/O in generic device drivers.

FIG. 4 illustrates an exemplary method 400 for handling I/O in generic device drivers. In an implementation, the method 400 enables a user software component (e.g., 112 of FIGS. 1 and 2) to leave hardware-specific I/O handling to the generic device drivers (e.g., 110 of FIGS. 1 and 2) by calling a few routines. For example, the user software component may simply issue initialize, read/write, and release commands provided through the generic USB user-mode library (e.g., 110 of FIG. 1), and leave the specific data length considerations, data fragmentation, and/or data reassembly to the generic device driver.

For example, the initialization may reset the generic USB device driver's state and behavior to a default and prepare the generic USB device driver to handle further operations. The reading may read data from a specific endpoint on the corresponding device and the writing may write data to a specific endpoint on the corresponding device. The release may clean up all resources claimed during the session that was started with the initialization.

With respect to data length considerations, a USB input (i.e., data from the device to a host or computing system discussed with reference to FIG. 5) endpoint can transfer anywhere from 0 bytes up to that endpoint's specified maximum packet size at a time, so the software on the host system needs to be prepared to receive up to this maximum size for each packet in the transfer (where a transfer is made up of multiple packets). If a user-mode software component (e.g., 112 of FIGS. 1 and 2) requests a transfer that is not a multiple of this maximum packet size, then the generic USB device driver may automatically adjust the size of this transfer. Accordingly, if the user software component requests a data transfer with a length insufficient to handle all possible data transfer sizes from the device, the length of the data transfer is increased. This may be accomplished by splitting the client's (the client being the user-mode software component) buffer into at least two separate transfers (this is also referred to as "segmentation"). The first transfer size may be the largest multiple of maximum packet size ("MaxPacket" hereinafter) that is less than the client's requested transfer size. The buffer for this first transfer is the first N*MaxPacket (where this value is the size of this first sub-transfer) of the client's buffer, so no memory copy is required. The second transfer is MaxPacket bytes. The buffer for this second transfer is a newly allocated buffer in an implementation. Once both transfers are complete, the data from the second transfer is copied back into the client's buffer until either the client buffer is full, or a short packet is reached. If any data is left over from the second transfer after the copy, it may or may not be saved away for the next transfer request, based on the pipe policy for that endpoint. It is also envisioned that if there is a short packet in the first transfer, the second transfer may never be issued.

Moreover, a USB host controller, in conjunction with the USB core stack (e.g., 106 of FIGS. 1 and 2), often may only handle transfer buffers up to a specific size. This size may be different for different host controller implementations. The generic USB device driver takes these size limits into account and if a client's transfer request exceeds this limit, the transfer is split into two or more transfers where all are less than or equal to this limit. In one implementation, there are no buffer copies required to implement this as each sub-transfer's buffer is just a part of the client's original buffer.

As illustrated in FIG. 4, the method 400 initializes in a stage 402, e.g., by defining a data structure utilized to access the device. The initialization stage may reset the policy settings to default values (as will be further discussed below with reference to exemplary APIs, such as WinUsb_Initialize). The initialization stage enables the generic user-mode library (e.g., the DLL associated with 110 of FIGS. 1 and 2) to run in one implementation.

The method 400 defines the pipe policy (404) which may define the behavior of the generic device driver including, for example, time outs, end of packets, auto recovery from error, packet termination guidelines, short packet handling, partial reads such as used for reading headers prior to the actual data to anticipate the amount of data that is to be transferred, discarding extra data that is of no interest, and/or raw data handling (which indicates that a user software component is guaranteeing proper data handling), as will be further discussed below with reference to exemplary APIs, such as WinUsb_SetPipePolicy. In an implementation, each endpoint may have a pipe in a generic USB driver that is individually configurable.

Some of these exemplary pipe behavior settings are further discussed below in accordance with various implementations:

Time-out—this pipe policy may be set for a specific endpoint and result in cancellation of any transfer for that endpoint which is not completed within the specified amount of time.

Packet termination guidelines—some USB device protocols require that the host computing system mark the end of an output transfer (from host to device) with a short-packet (a packet less than that endpoint's specified threshold maximum packet size). If the client's transfer is a multiple of that maximum packet size, then a zero length packet is sent. This may be done automatically for the user software component (or client), so that the client does not need to worry about the maximum packet size, or whether or not the transfer is a multiple of this size.

Auto-recovery from error—if there is a transfer error on the USB bus for a specific transfer on a specific endpoint, automatic recovery mechanisms may be enabled to attempt to clear the error condition, so that further transfers are permitted to be issued. It is also envisioned that an error condition may be non-recoverable (i.e., no further transfers will occur).

Short packet handling—generally, when a short packet is received from a specific endpoint on a USB device, the transfer is completed by the USB core stack (e.g., 106 of FIGS. 1 and 2). Sometimes the user software component does not intend for this to cause completion of the transfer, but would rather keep reading from the device until the specified number of bytes is received. In one implementation, this can be handled by configuring the generic USB device driver to ignore such events and keep reading data. This may be implemented by re-issuing the pre-maturely completed transfer with the buffer pointing to one byte passed the last received byte.

Partial read—some device protocols include a header at the beginning of a transfer that includes information about the data, including size information, transfer type, etc. Some clients may wish to read only this header before determining how to handle the rest of the transfer. To handle such a scenario, the client may set the behavior for the corresponding pipe (for which the transfer is targeted) to allow the client to read just the header, and then the generic USB device driver may save away any additional data received after the header in that packet, such that it will be added to the beginning of the client's subsequent transfer.

Discarding extra data—if a device sends more data in a packet than a client requested, the client may configure the generic USB device driver behavior for that endpoint to discard that extra data, or save it to be added to the beginning of a subsequent transfer.

Raw data—some clients would rather manage transfer limitations themselves in order to bypass the automatic behavior corrections of the generic USB device driver, for example, to improve performance with respect to specific device features. These clients may configure the generic USB device driver behavior for a specific endpoint, so that rather than correcting the client's behavior, it instead requires correct client behavior. Accordingly, this approach allows all the well-behaved client requests to be passed directly to the core USB stack.

In one implementation, the user software component may then define a first-in, first-out (FIFO) buffer policy (406) (e.g., for a specific pipe (endpoint)) and start filing the FIFO from the device (408), as will be further discussed below with reference to exemplary APIs, such as WinUsb_SetFifoPolicy and WinUSB_StartFifo. The FIFO may then be read (e.g., by calling WinUsb_ReadFifo API discussed below). In one implementation, one FIFO is provided for each pipe. It is also envisioned that data may be read by using WinUsb_ReadPipe. Accordingly, a FIFO is not required for reading data. However, a FIFO may be used for a specific class of devices which may generate data at an arbitrary time, or that constantly streams data, for example.

The pipe is then read or written to in a stage 410. Moreover, as detailed below, other APIs are available for handling I/O which enable a user software component to more finely control the I/O functions. For example, in an implementation, if the device responds with a packet that is too large for the client buffer, the data is added at the beginning of the next transfer (if this option is enabled, for example, by Allow_Partial_Reads).

Exemplary APIs

One or more exemplary APIs are illustrated below which may be utilized in the Microsoft Windows® environment to provide the routines discussed with reference to FIGS. 1 and 2. For example, routines (e.g., in generic USB user-mode library 110 of FIGS. 1 and 2) may support the following actions (as will be further discussed below):

querying for the USB descriptors: device, configuration, interface and string;
  enumerating USB device interfaces associated with a GUID device interface class, and filter them by means of a vendor-supplied callback routine;
  selectively activating some interfaces of a USB device and leaving others deactivated;
  generating standard control transfer requests; and/or
  transmit control, bulk, interrupt, and isochronous data.

The exemplary APIs discussed below are prefaced by "WinUSB" to indicate that they correspond to a generic USB device driver for the Microsoft Windows® OS. It is envisioned that other naming conventions may be utilized. Also, a sample call, parameter, and return values for each API is highlighted below.

1. WinUsb_Initialize

The WinUsb_Initialize function initializes the WinUsb data structures. Note that the policy settings are reset to the default values when this function is called. An exemplary method for calling this API is:

```
BOOL __stdcall
WinUsb_Initialize(
    IN HANDLE DeviceHandle,
    OUT PWINUSB_INTERFACE_HANDLE InterfaceHandle
    );
```

Parameters

DeviceHandle

The handle to the device that was returned by a routine to create a file (e.g., CreateFile). WinUsb uses overlapped I/O so a flag (e.g., FILE_FLAG_OVERLAPPED) should be specified in the CreateFile call.

InterfaceHandle

This is the interface handle that can be used for all other WinUSB API function calls. This is an opaque handle that is generated by WinUSB.

Return Value

This function returns TRUE if it succeeded. Otherwise, it returns FALSE, and the logged error can be retrieved by calling GetLastError.

2. WinUsb_Free

The WinUsb_Free function frees all the resources that were allocated by WinUsb_Initialize. An exemplary method for calling this API is:

```
BOOL __stdcall
WinUsb_Free(
    IN WINUSB_INTERFACE_HANDLE InterfaceHandle
    );
```

Parameters

InterfaceHandle

This is the interface handle that was returned by WinUsb_Initialize.

Return Value

This function returns TRUE if it succeeded. Otherwise, it returns FALSE, and the logged error can be retrieved by calling GetLastError.

3. WinUsb_QueryAlternateInterface

The WinUsb_QueryAlternateInterface function returns the first alternate interface descriptor for a particular interface handle. An exemplary method for calling this API is:

```
BOOL __stdcall
WinUsb_QueryAlternateInterface(
    IN WINUSB_INTERFACE_HANDLE InterfaceHandle,
    IN UCHAR AlternateInterfaceNumber,
    OUT PUSB_INTERFACE_DESCRIPTOR UsbAltInterfaceDescriptor
    );
```

Parameters

InterfaceHandle

This is the interface handle that was returned by WinUsb_Initialize.

AlternateInterfaceNumber

This is a value that indicates the alternate interface to return. A value of 0 indicates the first alternate interface, a value of 1 indicates the second alternate interface, and so forth.

UsbAltInterfaceDescriptor

A pointer to a caller-allocated USB_INTERFACE_DESCRIPTOR structure.

Return Value

This function returns TRUE if it succeeded and populated the structure. Otherwise, it returns FALSE, and the logged error can be retrieved by calling GetLastError.

4. WinUsb_QueryDeviceInformation

The WinUsb_QueryDeviceInformation function returns information about the physical device that is associated with a WINUSB interface. An exemplary method for calling this API is:

```
BOOL __stdcall
WinUsb_QueryDeviceInformation(
    IN WINUSB_INTERFACE_HANDLE InterfaceHandle,
    IN ULONG InformationType,
    IN OUT PULONG BufferLength,
    OUT PVOID Buffer
    );
```

Parameters

InterfaceHandle

This is the interface handle that was returned by WinUsb_Initialize.

InformationType

This is a value that specifies which interface information value to retrieve.

BufferLength

This the length, in bytes, of Buffer, or the maximum number of bytes to read. This parameter may be set to the actual number of bytes that were copied into Buffer.

Buffer

This is a caller-allocated buffer that receives the requested value.

Return Value

This function returns TRUE if it succeeded and populated the structure. Otherwise, it returns FALSE, and the logged error can be retrieved by calling GetLastError.

Notes

The following list describes the possible InformationType values.

DEVICE_SPEED (0x01)

This request will return one of the following values, based on the speed of the device.

LowSpeed (0x 01)
FullSpeed (0x 02)
HighSpeed (0x 03)

PHYSICAL_DEVICE_ID (0x02)

This value contains the physical device identifier of the device.

5. WinUsb_GetDescriptor

The WinUsb_GetDescriptor function returns a requested descriptor. An exemplary method for calling this API is:

```
BOOL __stdcall
WinUsb_GetDescriptor(
    IN WINUSB_INTERFACE_HANDLE InterfaceHandle,
    IN UCHAR DescriptorType,
    IN UCHAR Index,
    IN USHORT LanguageID,
    OUT PUCHAR Buffer,
    IN ULONG BufferLength,
    OUT PULONG LengthTransferred
    );
```

Parameters

InterfaceHandle

This is the interface handle that was returned by WinUsb_Initialize.

DescriptorType

This is a value that specifies the type of descriptor to return. For the standard values, reference may be made to the USB specification which is available at http://www.usb.org.

Index

This is the descriptor index, which is documented in the USB specification.

LanguageID

This is a value that specifies the language identifier, if the requested descriptor is a string descriptor.

Buffer

This is a caller-allocated buffer that receives the requested descriptor.

BufferLength

This is the length, in bytes, of Buffer, or the maximum number of bytes to read.

LengthTransferred

This receives the actual number of bytes that were copied into Buffer.

Return Value

This function returns TRUE if it succeeded and populated the structure. Otherwise, it returns FALSE, and the logged error can be retrieved by calling GetLastError.

6. WinUsb_SetCurrentAlternateInterface

The WinUsb_SetCurrentAlternateInterface function selects a specified alternate interface setting for an interface. An exemplary method for calling this API is:

```
BOOL __stdcall
WinUsb_SetCurrentAlternateInterface(
    IN WINUSB_INTERFACE_HANDLE InterfaceHandle,
    IN UCHAR InterfaceNumber
    );
```

Parameters

InterfaceHandle

This is the interface handle that was returned by WinUsb_Initialize.

InterfaceNumber

This is the value contained in the bInterfaceNumber member of the PUSB_INTERFACE_DESCRIPTOR structure, which was populated by WinUsb_QueryAlternateInterface.
Return Value
This function returns TRUE if it succeeded and populated the structure. Otherwise, it returns FALSE, and the logged error can be retrieved by calling GetLastError.

7. WinUsb_GetCurrentAlternateInterface

The WinUsb_GetCurrentAlternateInterface function gets the current alternate interface setting for an interface. An exemplary method for calling this API is:

```
BOOL __stdcall
WinUsb__GetCurrentAlternateInterface(
    IN WINUSB__INTERFACE__HANDLE InterfaceHandle,
    OUT PUCHAR InterfaceNumber
    );
```

Parameters

InterfaceHandle

This is the interface handle returned from WinUsb_Initialize

InterfaceNumber

This is a pointer to a UCHAR that will receive the currently selected alternate interface.
Return Value
This function returns TRUE, if the function succeeds and populates the structure. Otherwise, it returns FALSE and the logged error can be retrieved by a call to GetLastError.

8. WinUsb_QueryPipe

The WinUsb_QueryPipe function returns the pipe information for a specified pipe that is associated with an interface. Note that the default control pipe may not be returned. An exemplary method for calling this API is:

```
BOOL __stdcall
WinUsb__QueryPipe(
    IN WINUSB__INTERFACE__HANDLE InterfaceHandle,
    IN UCHAR AlternateInterfaceNumber,
    IN UCHAR PipeIndex,
    OUT PWINUSB__PIPE__INFORMATION PipeInformation
    );
```

Parameters

InterfaceHandle

This is the interface handle that was returned by WinUsb_Initialize.

AlternateInterfaceNumber

This is a value that specifies the alternate interface to which the information is to be return.

PipeIndex

This is a value that specifies the pipe to which the information is returned. This value is not the same as the PipeId in one implementation. Instead, it represents the pipe in the interface's list. A value of 0 signifies the first pipe, a value of 1 signifies the second pipe, and so forth. This value should be less than bNumEndpoints in the interface's descriptor.

PipeInformation

This is a pointer to a caller-allocated WINUSB_PIPE_INFORMATION structure.
Return Value
This function returns TRUE if it succeeded and populated the structure. Otherwise, it returns FALSE, and the logged error can be retrieved by calling GetLastError.
Notes
The definition of the WINUSB_PIPE_INFORMATION structure may be as follows:

```
typedef struct __WINUSB__PIPE__INFORMATION{
    USBD__PIPE__TYPE PipeType;
    UCHAR           PipeId;
    USHORT          MaximumPacketSize;
    UCHAR           Interval;
} WINUSB__PIPE__INFORMATION,
*PWINUSB__PIPE__INFORMATION;
```

The PipeId member is the USB 8-bit (hexadecimal) endpoint address, which consists of a 7-bit address and a direction bit.

9. WinUsb_SetPipePolicy

The WinUsb_SetPipePolicy function sets the policy for a specific pipe (endpoint). An exemplary method for calling this API is:

```
BOOL __stdcall
WinUsb__SetPipePolicy(
    IN WINUSB__INTERFACE__HANDLE InterfaceHandle,
    IN UCHAR PipeID,
    IN ULONG PolicyType,
    IN ULONG ValueLength,
    IN ULONG_PTR Value
    );
```

Parameters

InterfaceHandle

This is the interface handle that was returned by WinUsb_Initialize.

PipeID

This is the pipe identifier of the pipe to set the policy for.

PolicyType

This is a value that specifies the policy parameter to change.

ValueLength

This is the length, in bytes, of the buffer that Value points to, or zero if Value does not point to a buffer.

Value

The new value for the policy parameter that is specified by PolicyType.

Return Value

This function returns TRUE if it succeeded and populated the structure. Otherwise, it returns FALSE, and the logged error can be retrieved by calling GetLastError.

Notes

The following list describes the possible PolicyType values:

SHORT_PACKET_TERMINATE (0x01)

If Value is TRUE (nonzero), every WRITE(OUT) request that is a multiple of the maximum packet size for the endpoint is terminated with a zero-length packet. The default is FALSE.

AUTO_CLEAR_STALL (0x02)

If Value is TRUE (nonzero), a stall PID will be ignored and, unless first-in, first-out (FIFO) buffering is being used, an error will be returned. In this case, however, the pipe will not be halted and data will continue to flow. This parameter has no effect on CONTROL pipes. Note that the host automatically clears the device stall condition. The default is FALSE.

PIPE_TRANSFER_TIMEOUT (0x03)

Value is the amount of time, in milliseconds that a transfer should be cancelled after. A value of zero signifies an infinite amount of time. The default is an infinite amount of time.

IGNORE_SHORT_PACKETS (0x04)

If Value is TRUE (nonzero), a read operation will not complete when a short packet is received. Instead, the operation will complete only when the specified number of bytes is read. If Value is FALSE, a read operation will complete when either the specified number of bytes is read or a short packet is received. The default is FALSE.

ALLOW_PARTIAL_READS (0x05)

If Value is FALSE (zero), the read request will fail if the device returns more data than was requested. If Value is TRUE, the extra data is saved, and it is returned at the beginning of the data for the following read request. The default is TRUE.

AUTO_FLUSH (0x06)

If Value is FALSE (zero) and the device returns more data than was requested, the remaining data will be discarded. If Value is TRUE, the behavior on the value of ALLOW_PARTIAL_READS. Either the data will be saved and then returned at the beginning of the data for the following read request, or the request will fail. The default is FALSE.

Raw_IO (0x07)

This enables a user software component (such as 2 of FIGS. 1-2) to guarantee proper data handling. If the data provided by the user software component is in improper format, the data may be flushed.

10. WinUsb_GetPipePolicy

The WinUsb_GetPipePolicy function gets the policy for a specific pipe (endpoint). An exemplary method for calling this API is:

```
BOOL __stdcall
WinUsb__GetPipePolicy(
    IN WINUSB__INTERFACE__HANDLE InterfaceHandle,
    IN UCHAR PipeID,
    IN ULONG PolicyType,
    IN OUT PULONG ValueLength,
    OUT PVOID Value
    );
```

Parameters

InterfaceHandle

This is the interface handle that was returned by WinUsb_Initialize.

PipeID

This is the pipe identifier of the pipe to get the policy for.

PolicyType

This is a value that specifies the policy parameter to get.

ValueLength

This is a pointer to the length of the buffer that Value points to. On output, this parameter receives the length of the data that was copied into the Value buffer.

Value

This is a pointer to a buffer that receives the specified pipe policy value.

Return Value

This function returns TRUE if it succeeded and populated the structure. Otherwise, it returns FALSE, and the logged error can be retrieved by calling GetLastError.

11. WinUsb_SetFifoPolicy

The WinUsb_SetFifoPolicy function sets the policy for a specific pipe (endpoint). An exemplary method for calling this API is:

```
BOOL __stdcall
WinUsb__SetFifoPolicy(
    IN WINUSB__INTERFACE__HANDLE InterfaceHandle,
    IN UCHAR PipeID,
    IN ULONG Policy Type,
    IN ULONG ValueLength,
    IN ULONG__PTR Value
    ) ;
```

Parameters

InterfaceHandle

This is the interface handle that was returned by WinUsb_Initialize.

PipeID

This is the pipe identifier of the pipe to set the policy for.

PolicyType

This is a value that specifies the policy parameter to change.

ValueLength

This is the length, in bytes, of the buffer that Value points to, or zero if Value does not point to a buffer.

Value

This is the new value for the policy parameter that is specified by PolicyType.

Return Value

This function returns TRUE if it succeeded and populated the structure. Otherwise, it returns FALSE, and the logged error can be retrieved by calling GetLastError.

Notes

The following list describes the possible PolicyType values.

FIFO_SIZE (0x01)

Value is the size, in bytes, of the FIFO input buffer. The default value is 16× MaxPacketSize. If this limit is reached, data will be lost.

NOTIFICATION_THRESHOLD (0x03)

Value is the number of bytes that should be present in the FIFO buffer before the callback function is called. If IGNORE_SHORT_PACKETS is FALSE and a short packet is encountered, the callback function will be called anyway.

12. WinUsb_GetFifoPolicy

The WinUsb_GetFifoPolicy function gets the policy for a specific pipe (endpoint). An exemplary method for calling this API is:

```
BOOL __stdcall
WinUsb_GetFifoPolicy(
    IN WINUSB_INTERFACE_HANDLE InterfaceHandle,
    IN UCHAR PipeID,
    IN ULONG PolicyType,
    IN OUT PULONG ValueLength,
    OUT PVOID Value
    );
```

Parameters

InterfaceHandle

This is the interface handle that was returned by WinUsb_Initialize.

PipeID

This is the pipe identifier of the pipe to get the policy for.

PolicyType

This is a value that specifies the policy parameter to get.

ValueLength

This is a pointer to the length of the buffer that Value points to. On output, this parameter receives the length of the data that was copied into the Value buffer.

Value

This is a pointer to a buffer that receives the specified FIFO policy parameter.

Return Value

This function returns TRUE if it succeeded and populated the structure. Otherwise, it returns FALSE, and the logged error can be retrieved by calling GetLastError.

13. WinUsb_StartFifo

The WinUsb_StartFifo function starts the automatic read mechanism that reads data from the device into a FIFO buffer. When data is added to this buffer, the FifoDataNotification function is called, which notifies the client of the presence of the data. The client can then issue requests to read data from the FIFO buffer. An exemplary method for calling this API is:

```
BOOL __stdcall
WinUsb_StartFifo(
    IN WINUSB_INTERFACE_HANDLE InterfaceHandle,
    IN UCHAR PipeID,
    IN PWINUSB_NOTIFICATION_CALLBACK FifoDataNotification,
    IN PVOID FifoDataNotificationContext
    );
```

Parameters

InterfaceHandle

This is the interface handle that was returned by WinUsb_Initialize.

PipeID

This is the pipe identifier of the pipe to affect.

FifoDataNotification

This is an optional callback function to be called when the notification threshold is reached.

FifoDataNotificationContext

This is an optional context to be passed to the FifoDataNotification callback function.

Return Value

This function returns TRUE if it succeeded and populated the structure. Otherwise, it returns FALSE, and the logged error can be retrieved by calling GetLastError.

Notes

The PWINUSB_NOTIFICATION_CALLBACK type declaration is as follows:

```
typedef
VOID
(*PWINUSB_NOTIFICATION_CALLBACK)(
    WINUSB_INTERFACE_HANDLE InterfaceHandle,
    UCHAR PipeID,
    ULONG NotificationType,
```

```
        PVOID NotificationParameter,
        PVOID Context
        );
```

One possible value for the NotificationType member is FifoDataAvailable (0x01). This value indicates that the FIFO buffer contains enough data for a ReadFifo request of NOTIFICATION_THRESHOLD bytes to complete immediately. As such, the NotificationParameter member can be ignored.

14. WinUsb_StopFifo

The WinUsb_StopFifo function stops the automatic read mechanism. An exemplary method for calling this API is:

```
BOOL __stdcall
WinUsb__StopFifo(
    IN WINUSB__INTERFACE__HANDLE InterfaceHandle,
    IN UCHAR PipeID
    );
```

Parameters

InterfaceHandle

This is the interface handle that was returned by WinUsb_Initialize.

PipeID

This is the pipe identifier of the pipe to affect.
Return Value
This function returns TRUE if it succeeded and populated the structure. Otherwise, it returns FALSE, and the logged error can be retrieved by calling GetLastError.

15. WinUsb_ReadFifo

The WinUsb_ReadFifo function reads data from a pipe's FIFO buffer. Note that the USB packet size does not factor in to the transfer for a read request. If the device responds with a packet that is too large for the client buffer, the data is added at the beginning of the next transfer if ALLOW_PARTIAL_READS is TRUE. If ALLOW_PARTIAL_READS is FALSE, the read request will fail. An exemplary method for calling this API is:

```
BOOL __stdcall
WinUsb__ReadFifo(
    IN WINUSB__INTERFACE__HANDLE InterfaceHandle,
    IN UCHAR PipeID,
    OUT PUCHAR Buffer,
    IN ULONG BufferLength,
    OUT PULONG LengthTransferred,
    IN LPOVERLAPPED Overlapped
    );
```

Parameters

InterfaceHandle

This is the interface handle that was returned by WinUsb_Initialize.

PipeID

This is the identifier of the pipe to read from.

Buffer

This is a caller-allocated buffer to read the data into.

BufferLength

This is the length, in bytes, of Buffer, or the maximum number of bytes to read.

LengthTransferred

This is a pointer to a ULONG that receives the actual number of bytes that were copied into Buffer.

Overlapped

This is an optional pointer to an OVERLAPPED structure, which is used for asynchronous operations. If this parameter is specified, this function will immediately return, and the event is signaled when the operation is complete.
Return Value
This function returns TRUE if it succeeded and populated the structure. Otherwise, it returns FALSE, and the logged error can be retrieved by calling GetLastError.

16. WinUsb_ReadPipe

The WinUsb_ReadPipe function reads data from the pipe. Note that the USB packet size does not factor in to the transfer for a read request. If the device responds with a packet that is too large for the client buffer, the data is added at the beginning of the next transfer if ALLOW_PARTIAL_READS is TRUE. If ALLOW_PARTIAL_READS is FALSE, the read request will fail. An exemplary method for calling this API is:

```
BOOL __stdcall
WinUsb__ReadPipe(
    IN WINUSB__INTERFACE__HANDLE InterfaceHandle,
    IN UCHAR PipeID,
    IN PUCHAR Buffer,
    IN ULONG BufferLength,
    OUT PULONG LengthTransferred,
    IN LPOVERLAPPED Overlapped
    );
```

Parameters

InterfaceHandle

This is the interface handle that was returned by WinUsb_Initialize.

PipeID

This is the identifier of the pipe to read from.

Buffer

This is a caller-allocated buffer to read the data into.

BufferLength

This is the length, in bytes, of Buffer, or the maximum number of bytes to read.

LengthTransferred

This is a pointer to a ULONG that receives the actual number of bytes that were copied into Buffer.

Overlapped

This is an optional pointer to an OVERLAPPED structure, which is used for asynchronous operations. If this parameter is specified, this function will immediately return, and the event is signaled when the operation is complete.

Return Value

This function returns TRUE if it succeeded and populated the structure. Otherwise, it returns FALSE, and the logged error can be retrieved by calling GetLastError.

17. WinUsb_WritePipe

The WinUsb_WritePipe function writes data to the pipe. An exemplary method for calling this API is:

```
BOOL __stdcall
WinUsb_WritePipe(
    IN WINUSB_INTERFACE_HANDLE InterfaceHandle,
    IN UCHAR PipeID,
    IN PUCHAR Buffer,
    IN ULONG BufferLength,
    OUT PULONG LengthTransferred,
    IN LPOVERLAPPED Overlapped
    );
```

Parameters

InterfaceHandle

This is the interface handle that was returned by WinUsb_Initialize.

PipeID

This is the identifier of the pipe to write to.

Buffer

This is a caller-allocated buffer that contains the data to write.

BufferLength

This is the number of bytes to write.

LengthTransferred

This is a pointer to a ULONG that receives the actual number of bytes that were written to the pipe.

Overlapped

This is an optional pointer to an OVERLAPPED structure, which is used for asynchronous operations. If this parameter is specified, this function will return, and the event is signaled when the operation is complete.

Return Value

This function returns TRUE if it succeeded and populated the structure. Otherwise, it returns FALSE, and the logged error can be retrieved by calling GetLastError.

18. WinUsb_ControlTransfer

The WinUsb_ControlTransfer function transmits data over the default control endpoint. An exemplary method for calling this API is:

```
BOOL __stdcall
WinUsb_ControlTransfer(
    IN WINUSB_INTERFACE_HANDLE InterfaceHandle,
    IN WINUSB_SETUP_PACKET SetupPacket,
    IN PUCHAR Buffer,
    IN ULONG BufferLength,
    OUT PULONG LengthTransferred,
    IN LPOVERLAPPED Overlapped
    );
```

Parameters

InterfaceHandle

This is the interface handle that was returned by WinUsb_Initialize.

SetupPacket

This is the 8-byte setup packet.

Buffer

This is a caller-allocated buffer that contains the data to transfer.

BufferLength

This is the number of bytes to transfer, not including the setup packet.

LengthTransferred

This is a pointer to a ULONG that receives the actual number of transferred bytes.

Overlapped

This is an optional pointer to an OVERLAPPED structure, which is used for asynchronous operations. If this parameter is specified, this function will immediately return, and the event is signaled when the operation is complete.

Return Value

This function returns TRUE if it succeeded and populated the structure. Otherwise, it returns FALSE, and the logged error can be retrieved by calling GetLastError.

Notes

The WINUSB_SETUP_PACKET structure declaration is as follows:

```
typedef struct _WINUSB_SETUP_PACKET {
    UCHAR RequestType;
    UCHAR Request;
    USHORT Value;
    USHORT Index;
    USHORT Length;
} WINUSB_SETUP_PACKET, *PWINUSB_SETUP_PACKET;
```

19. WinUsb_ResetPipe

The WinUsb_ResetPipe function resets the data toggle and clears the stall condition on a pipe. An exemplary method for calling this API is:

```
BOOL __stdcall
WinUsb_ResetPipe(
    IN WINUSB_INTERFACE_HANDLE InterfaceHandle,
    IN UCHAR PipeID
);
```

Parameters

InterfaceHandle

This the interface handle that was returned by WinUsb_Initialize.

PipeID

This is the identifier of the control pipe.
Return Value
This function returns TRUE if it succeeded and populated the structure. Otherwise, it returns FALSE, and the logged error can be retrieved by calling GetLastError.

20. WinUsb_AbortPipe

The WinUsb_AbortPipe function aborts all the pending transfers for a pipe. An exemplary method for calling this API is:

```
BOOL __stdcall
WinUsb_AbortPipe(
    IN WINUSB_INTERFACE_HANDLE InterfaceHandle,
    IN UCHAR PipeID
);
```

Parameters

InterfaceHandle

This is the interface handle that was returned by WinUsb_Initialize.

PipeID

This is the identifier of the control pipe.
Return Value
This function returns TRUE if it succeeded and populated the structure. Otherwise, it returns FALSE, and the logged error can be retrieved by calling GetLastError.

21. WinUsb_FlushPipe

The WinUsb_FlushPipe function discards any data that was saved as a result of the device returning more data than the client requested. An exemplary method for calling this API is:

```
BOOL __stdcall
WinUsb_FlushPipe(
    IN WINUSB_INTERFACE_HANDLE InterfaceHandle,
    IN UCHAR PipeID
);
```

Parameters

InterfaceHandle

This is the interface handle that was returned by WinUsb_Initialize.

PipeID

This is the identifier of the control pipe.
Return Value
This function returns TRUE if it succeeded and populated the structure. Otherwise, it returns FALSE, and the logged error can be retrieved by calling GetLastError.

Power Management

Figure 5:
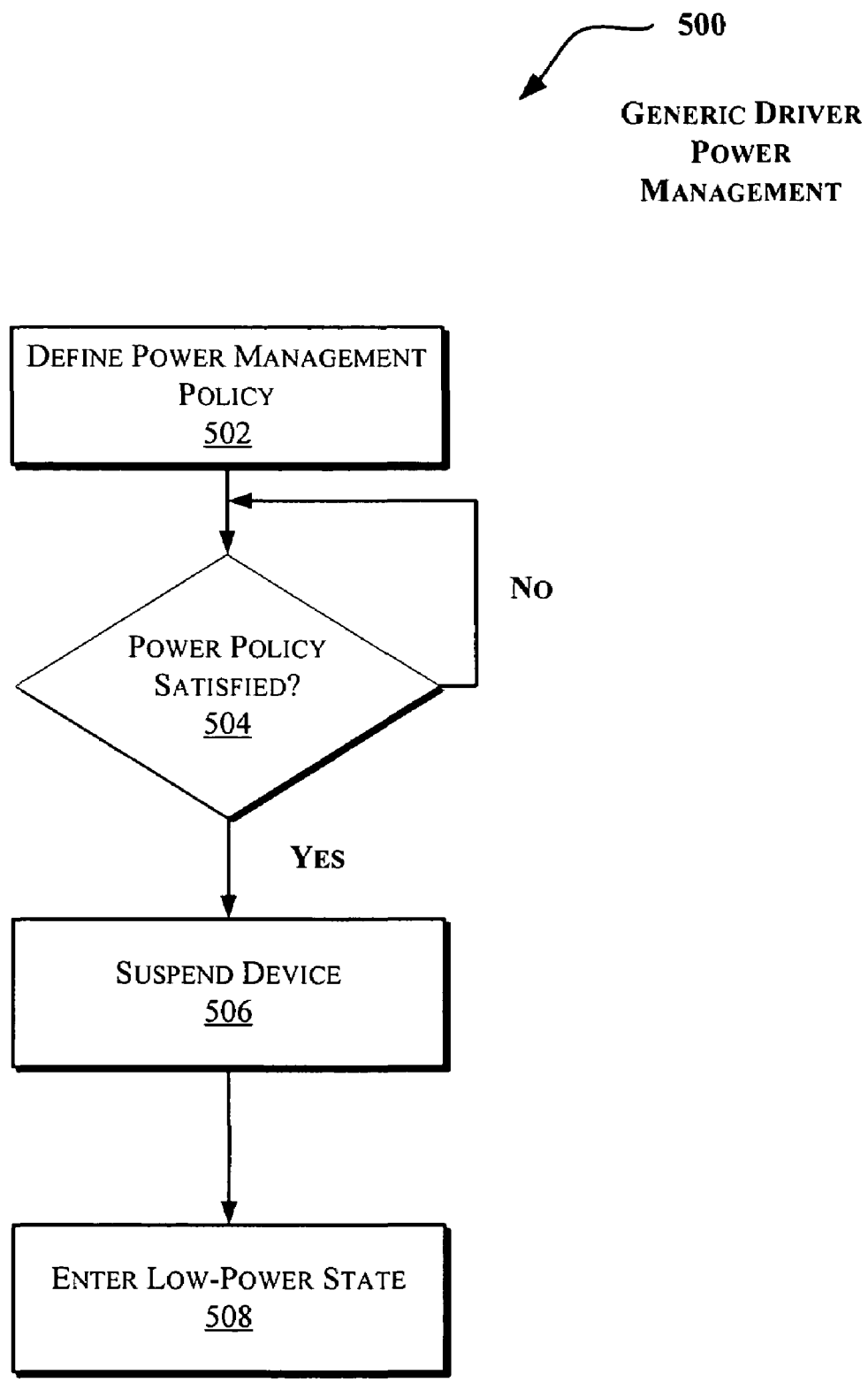
FIG. 5 illustrates an exemplary method for providing power management in generic device drivers.

FIG. 5 illustrates an exemplary method 500 for providing power management in generic device drivers. In an implementation, the method 500 enables a computing system (such as that discussed with reference to FIG. 6) to enter a low-power state while devices (such as those discussed with reference to FIGS. 1-4) are attached to it.

A power management policy is defined for the attached device(s) (502), e.g., through the generic USB user-mode library (e.g., 110 of FIG. 1). The power policy may include provisions on whether automatic suspension is allowed, whether the device may be automatically awakened, and/or whether a minimum delay threshold is set for suspending the device (as is further discussed with reference to the exemplary APIs, such as WinUsb_SetInterfacePowerPolicy).

More specifically, the automatic suspension may involve detecting when a device has become "idle," possibly meaning that there has not been a transfer in a specified amount of time, at which point the generic USB driver (e.g., 108 of FIGS. 1 and 2) may suspend the device to save power. In an implementation, the generic USB driver will automatically detect when the device needs to be powered back up, and will do so at the appropriate times.

With respect to automatically awakening the computing system, a client (such as 112 of FIGS. 1 and 2) may configure the generic USB device driver's behavior to allow the device to wake the computing system from a low-power state (e.g., standby or hibernation). In an implementation, the generic USB device driver will handle all operations required to prepare the device and the computing system for this capability.

Furthermore, the delay threshold time period may be set such that a client (such as 112 of FIGS. 1 and 2) may specify an amount of time that the generic USB device driver needs to guarantee will pass after the last transfer before suspending the device. Accordingly, the delay threshold may specify a time period after a data transfer and the computing system waits for the time period after the data transfer to pass before the device enters the suspend mode.

Once condition(s) for entering a suspend mode are met (e.g., in accordance with the power policy in effect) (504), the device enters a low-power state (506). This in turn allows the computing system to which the device is attached (whether through wires or wirelessly as discussed previously) to enter a low-power state (508).

The method 500 is envisioned to allow power savings even in situations where multiple devices are attached to a computing system by utilizing the functionality provided by the generic device drivers discussed herein. Namely, in absence of a generic device driver configuration, multiple devices attached to the computing system may not enter their suspend modes simultaneously or for a sufficient period of time to enable effective overall power saving by the computing system.

In various implementations, the following list summarizes the behavior across power management states:

All pipe handles, interface handles, locks, and alternate settings are preserved across power management events.

Any transfers that are in progress are suspended during a low-power state, and they are resumed when the system is working. If the client (i.e., the user software component 112) is using the FIFO buffer, that buffer is restarted after the power management callback.

If a device-specific configuration should be restored, the client (i.e., the user software component 112) should do so when the system returns to working. This can be determined from the WM_POWERBROADCAST message.

The client (i.e., the user software component 112) may indicate that the interface is idle by calling WINUSB_SetInterfaceIdle to support a selective suspend. The caller can specify that the device should be enabled for a remote wakeup while idle. No direct action is implied by this call.

Moreover, as detailed below, other APIs are available for handling power management which enable a user software component to more finely control the power management functions.

1. WinUsb_SetInterfacePowerPolicy

The WinUsb_SetInterfacePowerPolicy function sets the power policy for the device. An exemplary method for calling this API is:

```
BOOL _stdcall
WinUsb_SetInterfacePowerPolicy(
    WINUSB_INTERFACE_HANDLE InterfaceHandle,
    ULONG PolicyType,
    ULONG ValueLength,
    ULONG_PTR Value
);
```

Parameters

InterfaceHandle

This is the interface handle that was returned by WinUsb_Initialize.

PolicyType

This is a value that specifies the policy parameter to change.

ValueLength

This is the length, in bytes, of the buffer that Value points to, or zero if Value does not point to a buffer.

Value

This is the new value for the policy parameter that is specified by PolicyType.

Return Value

This function returns TRUE if it succeeded and populated the structure. Otherwise, it returns FALSE, and the logged error can be retrieved by calling GetLastError.

Notes

The following list describes the possible PolicyType values:

AUTO_SUSPEND (0x01)

If Value is TRUE (nonzero), the device will be suspended when no transfers are pending. The default is TRUE.

ENABLE_WAKE (0x02)

Set Value to TRUE if the device supports WAKE. The default is FALSE.

SUSPEND_DELAY (0x03)

Value is the minimum amount of time, in milliseconds, that the driver should wait after any transfer before it can suspend the device. The default is five seconds.

2. WinUsb_GetInterfacePowerPolicy

The WinUsb_GetInterfacePowerPolicy function gets the power policy for the device. An exemplary method for calling this API is:

```
BOOL _stdcall
WinUsb_GetInterfacePowerPolicy(
    IN WINUSB_INTERFACE_HANDLE InterfaceHandle,
    IN ULONG PolicyType,
    IN OUT PULONG ValueLength,
    OUT PVOID Value
);
```

Parameters

InterfaceHandle

This is the interface handle that was returned by WinUsb_Initialize.

PolicyType

This is a value that specifies the policy parameter to get.

ValueLength

This is a pointer to the length of the buffer that Value points to. On output, this parameter receives the length of the data that was copied into the Value buffer.

Value

This is a pointer to a buffer that receives the specified power policy value.

Return Value

This function returns TRUE if it succeeded and populated the structure. Otherwise, it returns FALSE, and the logged error can be retrieved by calling GetLastError.

3. WinUsb_EnableInterfaceIdle

The WinUsb_EnableInterfaceIdle function indicates that an in interface is idle so that the operating system can power down the device (USB suspend). This is how user-mode clients support a selective suspend. Any access (read or write) to one of the pipes automatically brings the interface out of the idle state, so no query of the idle state is provided. Calling this function does not guarantee that the device will be suspended; it is merely a suggestion that the device is currently capable of supporting USB suspend state. If the FIFO buffer is running, it will continue to run until the device is actually suspended. An exemplary method for calling this API is:

```
BOOL _stdcall
WinUsb_EnableInterfaceIdle(
    WINUSB_INTERFACE_HANDLE InterfaceHandle
);
```

Parameters

InterfaceHandle

This is the interface handle that was returned by WinUsb_Initialize.

Return Value

This function returns TRUE if it succeeded and populated the structure. Otherwise, it returns FALSE, and the logged error can be retrieved by calling GetLastError.

4. WinUsb_DisableInterfaceIdle

The WinUsb_DisableInterfaceIdle function either prevents the device from being suspended or wakes up the device if it has already been suspended. An exemplary method for calling this API is:

```
BOOL __stdcall
WinUsb_DisableInterfaceIdle(
    WINUSB_INTERFACE_HANDLE InterfaceHandle
);
```

Parameters

InterfaceHandle

The interface handle that was returned by WinUsb_Initialize.

Return Value

This function returns TRUE if it succeeded and populated the structure. Otherwise, it returns FALSE, and the logged error can be retrieved by calling GetLastError.

Security

In one implementation, security is provided through the named device object created by a IoRegisterDeviceInterface in the generic device driver 108. Security attributes can be specified for this symbolic link limiting who can open it.

In such an implementation, only one user software component (e.g., 112) can have the link opened at any given time, so when a software component opens the link no other software components can access the interface unless that software component gets the actual handle.

It is envisioned that the control pipe for a physical device may be shared among multiple interfaces (e.g., for different functionalities supported by the device), so a user software component may be able to send control commands to another interface. This may require certain restrictions on control transfers in an implementation. Additionally, security access on a symbolic link may be handled by setting the security attributes on the PDO (204).

General Computing Environment

Figure 6:
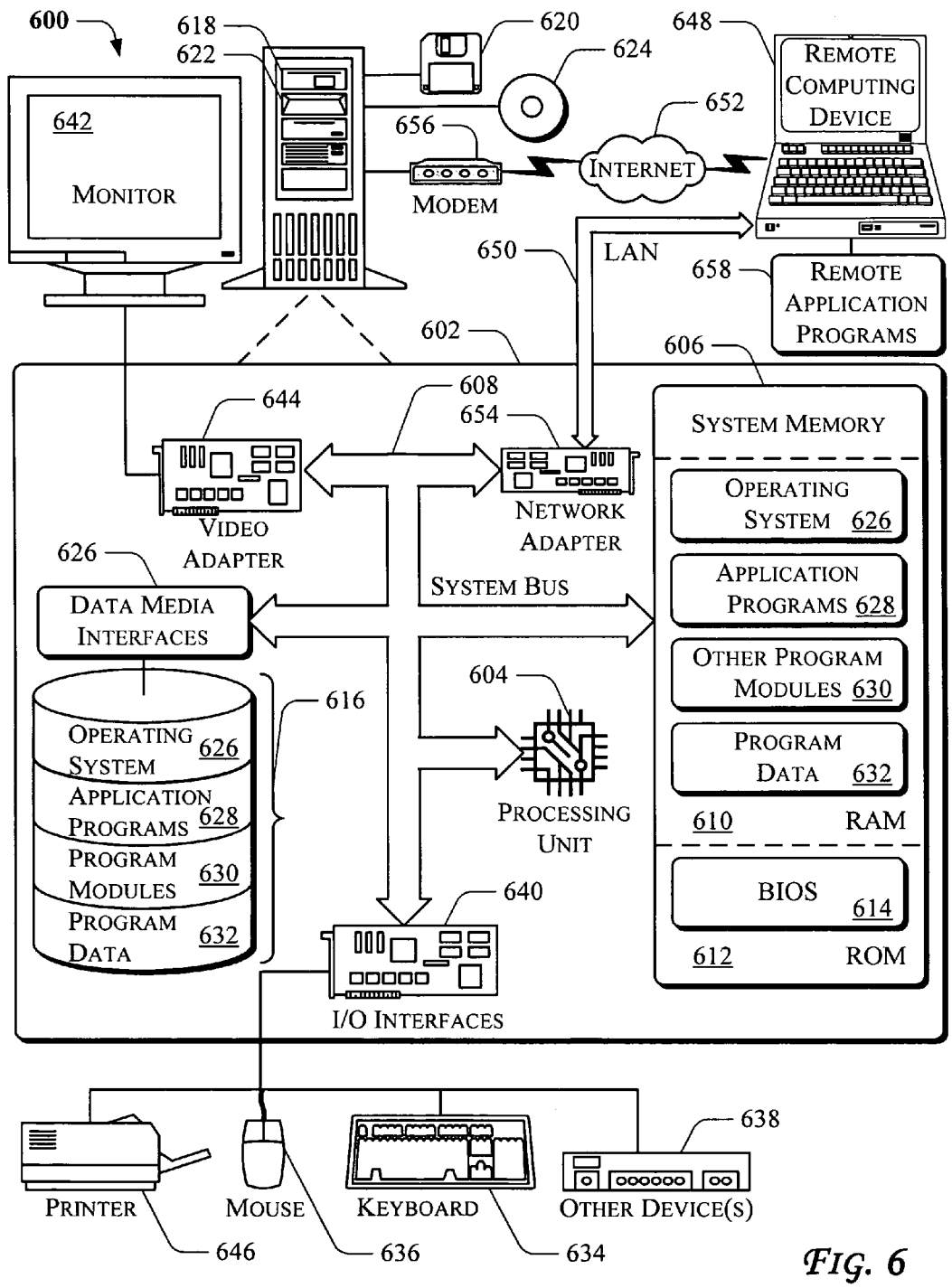
FIG. 6 illustrates a general computer environment, which can be used to implement the techniques described herein.

FIG. 6 illustrates a general computer environment 600, which can be used to implement the techniques described herein. For example, the computer environment 600 may be utilized to run the OS including the generic device driver (108), the generic user-mode library (110), and/or the user software component (112). The computer environment 600 is only one example of a computing environment and is not intended to suggest any limitation as to the scope of use or functionality of the computer and network architectures. The computer environment 600 should also not be interpreted as having any dependency or requirement relating to any one or a combination of components illustrated in the exemplary computer environment 600.

Computer environment 600 includes a general-purpose computing device in the form of a computer 602. The components of computer 602 can include, but are not limited to, one or more processors or processing units 604 (optionally including a cryptographic processor or co-processor), a system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 602 typically includes a variety of computer-readable media. Such media can be any available media that is accessible by computer 602 and includes both volatile and non-volatile media, removable and non-removable media.

The system memory 606 includes computer-readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 610 typically contains data and/or program modules that are immediately accessible to and/or presently operated on by the processing unit 604.

Computer 602 may also include other removable/non-removable, volatile/non-volatile computer storage media. By way of example, FIG. 6 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 626. Alternatively, the hard disk drive 616, magnetic disk drive 618, and optical disk drive 622 can be connected to the system bus 608 by one or more interfaces (not shown).

The disk drives and their associated computer-readable media provide non-volatile storage of computer-readable instructions, data structures, program modules, and other data for computer 602. Although the example illustrates a hard disk 616, a removable magnetic disk 620, and a removable optical disk 624, it is to be appreciated that other types of computer-readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, and program data 632 (or some combination thereof) may implement all or part of the resident components that support the distributed file system.

A user can enter commands and information into computer 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a USB (such as discussed with reference to FIGS. 1 and 2). The USB port may be utilized to connect a camera, personal digital assistant (PDA), MP3 device, video capture device, a flash card reader, and the like to the computer environment 600.

A monitor 642 or other type of display device can also be connected to the system bus 608 via an interface, such as a video adapter 644. In addition to the monitor 642, other output peripheral devices can include components such as speakers (not shown) and a printer 646 which can be connected to computer 602 via the input/output interfaces 640.

Computer 602 can operate in a networked environment using logical connections to one or more remote computers, such as a remote computing device 648. By way of example, the remote computing device 648 can be a personal computer, portable computer, a server, a router, a network computer, a peer device or other common network node, game console, and the like. The remote computing device 648 is illustrated as a portable computer that can include many or all of the elements and features described herein relative to computer 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components such as the operating system are illustrated herein as discrete blocks, although it is recognized that such programs and components reside at various times in different storage components of the computing device 602, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various implementations.

An implementation of these modules and techniques may be stored on or transmitted across some form of computer-readable media. Computer-readable media can be any available media that can be accessed by a computer. By way of example, and not limitation, computer-readable media may include "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically includes computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, Wi-Fi, cellular, Bluetooth enabled, and other wireless media. Combinations of any of the above are also included within the scope of computer-readable media.

In one implementation, the hardware device whose information is accessed (such as discussed with reference to FIGS. 1 and 2) may be any device coupled with components of the general computer environment 600 (such as the processing units 604). Also, the hardware device may be a peripheral device of the general computer environment 600 (such as the mouse 636, keyboard 634, printer 646, and the like).

CONCLUSION

Thus, although the invention has been described in language specific to structural features and/or methodological acts, it is to be understood that the invention defined in the appended claims is not necessarily limited to the specific features or acts described. For example, the techniques described herein may be applied to wired or wireless communication channels (such as Bluetooth, small computer system interface (SCSI), and the like). Accordingly, the specific features and acts are disclosed as exemplary forms of implementing the claimed invention.

What is claimed is:
1. A method comprising:
defining a power management policy for a USB device plugged into a computing system, wherein the power management policy is defined through a plurality of routines provided by a generic user-mode library, the plurality of routines being implemented as an application programming interface, the generic user-mode library being generic to a plurality of different USB devices, wherein a separate kernel-mode generic device driver is loaded for each USB device plugged into the computing system or for each functionality supported by the USB device, wherein the kernel-mode generic device driver is configured to enable a plurality of different USB devices to operate once plugged into the computing system;

determining when the USB device enters a suspend mode by using the defined power management policy;

entering the suspend mode such that the USB device is switched to a low-power state by invoking a user-mode software component, the generic user-mode library being communicatively coupled to a kernel-mode generic device driver so that the user-mode software component manages the USB device by invoking routines in a user-mode environment rather than by invoking the routines in a kernel-mode environment; and once the USB device enters the suspend mode, then switching the computing system to a lower-power state.

2. A method as recited in claim 1, wherein the USB device enters the suspend mode after the USB device is idle for a specified idle time, and wherein the specified idle time is set by calling a USB power policy function.

3. A method as recited in claim 1, wherein the kernel-mode generic device driver is loaded in response to a plug-in event of the USB device, wherein the power management policy defines the behavior of the kernel-mode generic device driver, and wherein the user-mode software component is enabled to communicate with each kernel-mode generic device driver through functionality discovered by a globally unique identifier associated with each USB device.

4. A method as recited in claim 1, wherein the kernel-mode generic device driver is loaded in response to a plug-in event of the USB device and wherein the plug-in event is detected by a plug and play (PNP) module.

5. A method as recited in claim 1, wherein the power management policy comprises one or more provisions selected from a group comprising automatic suspension allowance, automatic device awakening allowance, and a delay threshold setting for suspending the device.

6. A method as recited in claim 5, wherein the automatic suspension allowance comprises detecting when a USB device has become idle and suspending the USB device once it is determined that the device is idle.

7. A method as recited in claim 5, wherein the automatic suspension allowance provision comprises a provision for waking the USB device from the suspend mode once it is determined that the USB device should be powered up.

8. A method as recited in claim 6, wherein the automatic device awakening allowance comprises a provision to allow the USB device to wake the computing system from the low-power state.

9. A method as recited in claim 5, wherein the delay threshold specifies a time period after a data transfer and the computing system waits for the time period after the data transfer to pass before the USB device enters the suspend mode.

10. A method as recited in claim 1, wherein pipe handles, interface handles, locks, and alternate settings are preserved across power management events defined by the power management policy.

11. One or more computer-readable storage media having instructions stored thereon that, when executed, direct a machine to perform a method, the method comprising:

defining a power management policy for a USB device plugged into a computing system, wherein the power management policy is defined through a plurality of routines provided by a generic user-mode library, the plurality of routines being implemented as an application programming interface, the generic user-mode library being generic to a plurality of different USB devices, wherein a separate kernel-mode generic device driver is loaded for each USB device plugged into the computing system or for each functionality supported by the USB device, wherein the kernel-mode generic device driver is configured to enable a plurality of different USB devices to operate once plugged into the computing system;

determining when the USB device enters a suspend mode by using the defined power management policy;

entering the suspend mode such that the USB device is switched to a low-power state by selectively invoking a user-mode software component, the generic user-mode library being communicatively coupled to a kernel-mode generic device driver so that the user-mode software component manages the USB device by invoking routines in a user-mode environment rather than by invoking the routines in a kernel-mode environment; and once the USB device enters the suspend mode, then switching the computing system to a lower-power state.

12. One or more computer-readable storage media as recited in claim 11, wherein the kernel-mode generic device driver is loaded in response to a plug-in event of the USB device.

13. One or more computer-readable storage media as recited in claim 11, wherein the kernel-mode generic device driver is loaded in response to a plug-in event of the USB device and wherein the plug-in event is detected by a plug and play (PNP) module.

14. One or more computer-readable storage media as recited in claim 11, wherein the power management policy comprises one or more provisions selected from a group comprising automatic suspension allowance, automatic device awakening allowance, and a delay threshold setting for suspending the USB device.

15. One or more computer-readable storage media as recited in claim 14, wherein the automatic suspension allowance comprises detecting when a USB device has become idle and suspending the USB device once it is determined that the USB device is idle.

16. One or more computer-readable storage media as recited in claim 14, wherein the automatic suspension allowance provision comprises a provision for waking the USB device from the suspend mode once it is determined that the USB device should be powered up.

17. One or more computer-readable storage media as recited in claim 14, wherein the automatic device awakening allowance comprises a provision to allow the USB device to wake the computing system from the low-power state.

18. One or more computer-readable storage media as recited in claim 14, wherein the delay threshold specifies a time period after a data transfer and the computing system waits for the time period after the data transfer to pass before the USB device enters the suspend mode.

19. One or more computer-readable storage media as recited in claim 11, wherein pipe handles, interface handles, locks, and alternate settings are preserved across power management events defined by the power management policy.

* * * * *